United States Patent
He et al.

(10) Patent No.: US 11,041,135 B2
(45) Date of Patent: Jun. 22, 2021

(54) CUTTING FLUID, PREPARATION METHOD AND APPLICATION THEREOF

(71) Applicant: Xi'an Space Engine Company Limited, Shaanxi (CN)

(72) Inventors: Xiaohu He, Shaanxi (CN); Bo Lu, Shaanxi (CN); Lin Liu, Shaanxi (CN); Xiaowen Dong, Shaanxi (CN); Bo Li, Shaanxi (CN); Jing Hao, Shaanxi (CN); Yedong Li, Shaanxi (CN)

(73) Assignee: Xi'an Space Engine Company Limited, Xi'an (CN)

(*) Notice: Subject to any disclaimer, the term of this patent is extended or adjusted under 35 U.S.C. 154(b) by 3 days.

(21) Appl. No.: 16/576,772

(22) Filed: Sep. 20, 2019

(65) Prior Publication Data

US 2020/0148967 A1     May 14, 2020

(30) Foreign Application Priority Data

Nov. 13, 2018  (CN) .......................... 201811348781.8

(51) Int. Cl.
  *C10M 105/50* (2006.01)
  *B23B 1/00* (2006.01)
  (Continued)

(52) U.S. Cl.
  CPC ............. *C10M 105/50* (2013.01); *B23B 1/00* (2013.01); *C10M 105/24* (2013.01);
  (Continued)

(58) Field of Classification Search
  CPC ............. C10M 105/50; C10M 105/24; C10M 2207/126; C10M 2211/003; C10M 111/02; C10M 2207/401; C10M 2211/0225; C10M 141/04; C10M 2207/40; C10M 2211/022; B23B 1/00; C10N 2030/76;
  (Continued)

(56) References Cited

U.S. PATENT DOCUMENTS

| | | | |
|---|---|---|---|
| 5,484,542 A | 1/1996 | Cahoon et al. | |
| 2005/0211029 A1* | 9/2005 | Zurecki | B23Q 11/1053 82/1.11 |
| 2006/0025313 A1* | 2/2006 | Boffa | C10M 163/00 508/199 |

FOREIGN PATENT DOCUMENTS

| | | | |
|---|---|---|---|
| CN | 104119996 A | * | 10/2014 |
| CN | 104479826 A | | 4/2015 |

(Continued)

*Primary Examiner* — Taiwo Oladapo

(57) ABSTRACT

The present application relates to metal cutting, and more particularly to a cutting fluid and a preparation method and an application thereof, especially the application in the processing of niobium-tungsten alloy (NB521). The preparation method of the cutting fluid is simple and requires low production cost. In the mechanical processing of niobium-tungsten alloy (NB521), the cutting fluid has good cooling performance, lubricity, load-bearing capacity, friction reduction and vibration absorption, and long service life. It also can effectively avoid built-up edges, thereby improving the service life of cutting tools and the processibility of materials. Therefore, products of good quality are produced to improve the yield, especially in the deep hole machining, and thus the cutting fluid of the present application is suitable for a wide range of applications.

8 Claims, 1 Drawing Sheet

(51) Int. Cl.
*C10M 105/24* (2006.01)
*C10N 30/00* (2006.01)
*C10N 40/20* (2006.01)
*C10N 40/22* (2006.01)

(52) U.S. Cl.
CPC . *C10M 2207/126* (2013.01); *C10M 2211/003* (2013.01); *C10N 2030/76* (2020.05); *C10N 2040/22* (2013.01); *C10N 2040/244* (2020.05)

(58) Field of Classification Search
CPC .......... C10N 2040/244; C10N 2040/22; C10N 2030/06; B23Q 11/1061
See application file for complete search history.

(56) References Cited

FOREIGN PATENT DOCUMENTS

| | | | | |
|---|---|---|---|---|
| CN | 106085565 A | 11/2016 | | |
| GB | 981524 A | * | 1/1965 | .............. C10L 1/103 |

* cited by examiner

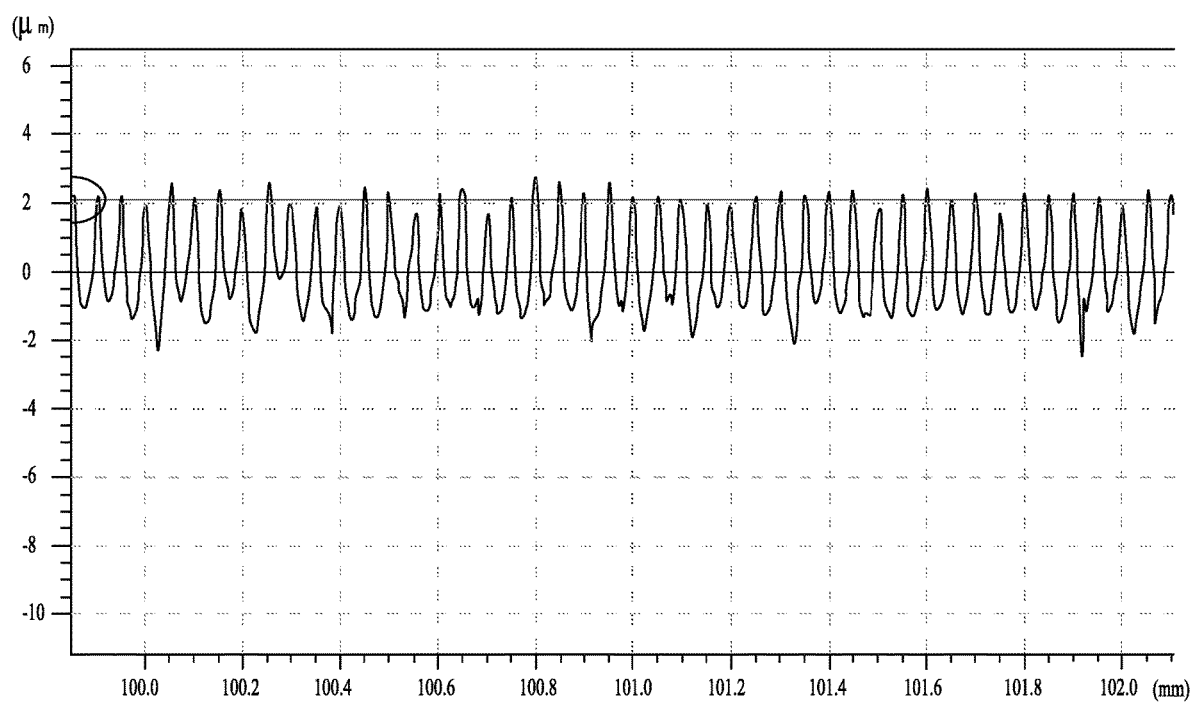

CUTTING FLUID, PREPARATION METHOD AND APPLICATION THEREOF

CROSS-REFERENCE TO RELATED APPLICATIONS

This application claims the benefit of priority from Chinese Patent Application No. 201811348781.8, filed on Nov. 13, 2018. The content of the aforementioned application, including any intervening amendments thereto, is incorporated herein by reference in its entirety.

TECHNICAL FIELD

The present application relates to machining of metals, and more particularly to a cutting fluid, and its preparation method and application in niobium-tungsten alloy (NB521) processing.

BACKGROUND OF THE INVENTION

Cutting fluid is an important material for metal cutting in the industrial application, and it is often used to cool and lubricate cutting tools and processing work-pieces during cutting, turning and milling of metals. Commercially available cutting fluids are mainly divided into three categories: emulsified cutting fluid, semi-synthetic cutting fluid and synthetic cutting fluid.

Niobium-tungsten alloy (NB521) has high strength at 1100-1650° C. and good welding performance, as well as good plasticity at room temperature to form thin plates and parts with complex shapes. Therefore, it can be used as optimal thermal protection materials and structural materials for supersonic aircraft, aerospace flight vehicle, satellites, missiles, and supersonic low-altitude rockets. In the aerospace field, niobium alloy can be applied in two-component liquid rocket engine with high specific impulse, adjustable thrust, and multiple-startable capability. Nb521 niobium-tungsten alloy (Nb-5W-2Mo-1Zr) has an excellent high-temperature performance to fully meet the requirements of the engine body, thereby widely applying in liquid rocket engines. However, due to its superior properties, Niobium-tungsten alloy is hard to be processed since a tip of the cutting tool is extremely subjected to the abrasion or even breakage during the machining, and the product is extremely vulnerable to hook-like flaw during the processing, which greatly increases the processing difficulty.

SUMMARY OF THE INVENTION

The present invention provides a cutting fluid, a preparation method and application thereof to overcome the shortcomings of the prior art.

The technical solutions of the present invention are as follows.

A cutting fluid, comprising carbon tetrachloride and lard, wherein a volume ratio of the carbon tetrachloride to the lard is 1:3-4.

The carbon tetrachloride ($CCl_4$) has a molecular weight of 153.82, a density (20° C.) of 1.592-1.598 g/ml, and a purity of 99.5% or more.

The lard has a general formula of $C_nH_{(2n+1)}COOH$, and comprises 49% by weight of oleic acid, 26% by weight of palmitic acid, 15% by weight of stearic acid, 5% by weight of linoleic acid, 1.5% by weight of palmitoleic acid, 1.5% by weight of myristic acid, and 2% by weight of moisture and impurities; and its melting point is 28-48° C.

The present application provides a method of preparing the cutting fluid, comprising:

mixing and stirring the lard and the carbon tetrachloride at 15-25° C. to obtain the cutting fluid.

The present application further provides an application of the cutting fluid, comprising: applying the cutting fluid between a product to be cut and a cutting tool by brushing or spraying, and the cutting tool is used in mechanical lathe-turning and milling for a product to be cut, and the product to be cut is exemplarily niobium-tungsten alloy (NB521).

The beneficial effects are as follows.

(1) The preparation method of the cutting fluid is simple and requires low production cost. In the mechanical processing of the niobium-tungsten alloy (NB521), the cutting fluid has good cooling performance, lubricity, load-bearing capacity, friction reduction and vibration absorption, and long service life. It also can effectively avoid built-up edges, thereby improving the service life of cutting tools and the processibility of materials. Therefore, products of good quality are produced to improve the yield, especially in the deep hole machining, and thus the cutting fluid of the present application is suitable for a wide range of applications.

(2) The present invention discloses the cutting fluid used for niobium-tungsten alloy (NB521) which is hard to be processed, and the preparation method of the cutting fluid. The cutting fluid comprises 20-25% by volume of the carbon dioxide and 75-80% by volume of the animal fat oil (the lard), where the carbon tetrachloride ($CCl_4$) has a molecular weight of 153.82, a density (20° C.) of 1.592-1.598 g/ml, and a purity of 99.5% or more. The lard has a general formula of $C_{n(2n+1)}COOH$, and comprises 49% by weight of oleic acid, 26% by weight of palmitic acid, 15% by weight of stearic acid, 5% by weight of linoleic acid, 1.5% by weight of palmitoleic acid, 1.5% by weight of myristic acid, and 2% by weight of moisture and impurities; and its melting point is 28-48° C. The preparation method of the cutting fluid is simple and mild for operation, and requires low production cost. In the mechanical processing of the niobium-tungsten alloy (NB521), the cutting fluid has good cooling performance, lubricity, load-bearing capacity, and friction reduction and vibration absorption. It also can effectively avoid built-up edges, thereby improving the service life of cutting tools and the processibility of materials. Therefore, products of good quality are produced to improve the yield, especially in the deep hole machining, and thus the cutting fluid of the present application is suitable for a wide range of applications.

BRIEF DESCRIPTION OF THE DRAWINGS

FIG. 1 is a schematic diagram showing a surface quality (roughness) of a product that is prepared using a cutting fluid for niobium-tungsten alloy (NB521) according to an embodiment of the present invention.

DETAILED DESCRIPTION OF EMBODIMENTS

The present invention will be further described in detail below with reference to the embodiments.

A cutting fluid for niobium-tungsten alloy (NB521) comprises: carbon tetrachloride (condensed formula: $CCl_4$; molecular weight: 153.82; purity: 99.5% or more; density (20° C.): 1.592-1.598 g/ml); lard (general formula: $C_nH_{(2n+1)}COOH$; composition: 49% by weight of oleic acid, 26% by weight of palmitic acid, 15% by weight of stearic acid, 5% by weight of linoleic acid, 1.5% by weight of palmitoleic acid, 1.5% by weight of myristic acid, and 2% by weight of moisture and impurities; melting point: 28-48° C.).

The present application provides a method of preparing the cutting fluid for niobium-tungsten alloy (NB521), and the method comprises the following steps:

1) preparing a container (e.g., a 3 L glass container) and a tool (e.g., a stainless steel stirring rod with a diameter of 10 mm);

2) at 15-25° C., placing the lard to the glass container, and then slowly adding the carbon tetrachloride to the glass container under stirring, where the lard is 75-80% by volume, and the carbon tetrachloride is 20-25% by volume; stirring the mixture clockwise at a speed of 30-50 r/min for 1 min, then stirring the mixture counterclockwise at a speed of 30-50 r/min for 1 min, performing the two stirring methods alternately until the mixture is uniformly mixed, thereby obtaining the cutting fluid for processing the niobium-tungsten alloy (NB521).

The cutting fluid is applied between the niobium-tungsten alloy and a cutting tool by brushing or spraying, and is suitable for mechanical lathe-turning and milling of the niobium-tungsten alloy.

Example 1

This embodiment provides a method of preparing a cutting fluid for niobium-tungsten alloy (NB521), comprising the following steps.

Raw materials, carbon tetrachloride and lard were used to produce the cutting fluid for niobium-tungsten alloy (NB521).

A container (e.g., a 3 L glass container) and a tool (e.g., a stainless steel stirring rod with a diameter of 10 mm) were used to produce the cutting fluid for niobium-tungsten alloy (NB521).

At 20-25° C., 80 ml of animal fat oil was placed in the container, then 20 ml of carbon tetrachloride was slowly added to the container under stirring. The mixture was stirred clockwise at a speed of 30-50 r/min for 1 min, and then the mixture was stirred counterclockwise at a speed of 30-50 r/min for 1 min. The two stirring methods were alternately performed until the mixture was uniformly mixed, thereby obtaining the cutting fluid for processing the niobium-tungsten alloy (NB521).

The cutting fluid was applied between the niobium-tungsten alloy (NB521) and the cutting tool of mechanical lathe-turning by brushing or spraying. The niobium-tungsten alloy (NB521) was subjected to lathe-turning, then the lathe-turned niobium-tungsten alloy (NB521) was measured on surface roughness, and the result was shown in FIG. 1 that the surface roughness of the lathe-turned niobium-tungsten alloy (NB521) reached Ra1.6 or more, indicating that the lathe-turned niobium-tungsten alloy (NB521) has desired surface roughness after cut with the cutting fluid.

Example 2

This embodiment provides a method of preparing a cutting fluid for niobium-tungsten alloy (NB521), comprising the following steps.

Raw materials, carbon tetrachloride and lard were used to produce the cutting fluid for niobium-tungsten alloy (NB521).

A container (e.g., a 3 L glass container) and a tool (e.g., a stainless steel stirring rod with a diameter of 10 mm) were used to produce the cutting fluid for the niobium-tungsten alloy (NB521).

At 15-20° C., 80 ml of animal fat oil was placed in the container, then 20 ml of carbon tetrachloride was slowly added to the container under stirring. The mixture was stirred clockwise at a speed of 30-50 r/min for 1 min, and then the mixture was stirred counterclockwise at a speed of 30-50 r/min for 1 min. The two stirring methods were alternately performed until the mixture was uniformly mixed, thereby obtaining the cutting fluid for processing the niobium-tungsten alloy (NB521).

The cutting fluid was applied between the niobium-tungsten alloy (NB521) and the cutting tool of mechanical lathe-turning by brushing or spraying. The niobium-tungsten alloy (NB521) were subjected to lathe-turning, then the lathe-turned niobium-tungsten alloy (NB521) was measured on surface roughness, and the result was shown that the surface roughness of the lathe-turned niobium-tungsten alloy (NB521) reached Ra1.6 or more, indicating that the lathe-turned niobium-tungsten alloy (NB521) has desired surface roughness after cut with the cutting fluid.

Example 3

This embodiment provides a method of preparing a cutting fluid for niobium-tungsten alloy (NB521), comprising the following steps.

Raw materials, carbon tetrachloride and lard were used to produce the cutting fluid for niobium-tungsten alloy (NB521).

A containers (e.g., a 3 L glass container) and a tool (e.g., a stainless steel stirring rod with a diameter of 10 mm) were used to produce the cutting fluid for the niobium-tungsten alloy (NB521).

At 20-25° C., 75 ml of animal fat oil was placed in the container, then 25 ml of carbon tetrachloride was slowly added to the container under stirring; the mixture was stirred clockwise at a speed of 30-50 r/min for 1 min, and then the mixture was stirred counterclockwise at a speed of 30-50 r/min for 1 min. The two stirring methods were alternately performed until the mixture was uniformly mixed, thereby obtaining the cutting fluid for processing the niobium-tungsten alloy (NB521).

The cutting fluid was applied between the niobium-tungsten alloy (NB521) and the cutting tool of mechanical turning by brushing or spraying. The niobium-tungsten alloy (NB521) were subjected to lathe-turning, then the lathe-turned niobium-tungsten alloy (NB521) was measured on surface roughness, and the result was shown that the surface roughness of the lathe-turned niobium-tungsten alloy (NB521) reached Ra1.6 or more, indicating that the lathe-turned niobium-tungsten alloy (NB521) has desired surface roughness after cut with the cutting fluid.

Example 4

This embodiment provides a method of preparing a cutting fluid for niobium-tungsten alloy (NB521), comprising the following steps.

Raw materials, carbon tetrachloride and lard were used to produce the cutting fluid for niobium-tungsten alloy (NB521).

A containers (e.g., a 3 L glass container) and a tool (e.g., a stainless steel stirring rod with a diameter of 10 mm) were used to produce the cutting fluid for the niobium-tungsten alloy (NB521).

At 15-20° C., 75 ml of animal fat oil was placed in the container, then 25 ml of carbon tetrachloride was slowly added to the container under stirring; the mixture was stirred clockwise at a speed of 30-50 r/min for 1 min, and then the mixture was stirred counterclockwise at a speed of 30-50 r/min for 1 min. The two stirring methods were alternately performed until the mixture was uniformly mixed, thereby obtaining the cutting fluid for processing the niobium-tungsten alloy (NB521).

The prepared cutting fluid was applied between the niobium-tungsten alloy (NB521) and the cutting tool of mechanical lathe-turning by brushing or spraying. The niobium-tungsten alloy (NB521) were subjected to lathe-turning, then the lathe-turned niobium-tungsten alloy (NB521) was measured on surface roughness, and the result was shown that the surface roughness of the lathe-turned niobium-tungsten alloy (NB521) reached Ra1.6 or more, indicating that the lathe-turned niobium-tungsten alloy (NB521) has desired surface roughness after cut with the cutting fluid.

The preparation method of the cutting fluid is simple and mild for operation and requires low production cost. In the mechanical processing of the niobium-tungsten alloy (NB521), the cutting fluid has good cooling performance, lubricity, load-bearing capacity, and friction reduction and vibration absorption. It also can effectively avoid built-up edges, thereby improving the service life of cutting tools and the processibility of materials. Therefore, products of good quality are produced to improve the yield, especially in the deep hole machining, and thus the cutting fluid of the present application is suitable for a wide range of applications.

The above are some exemplary embodiments of the present invention, which are not intended to limit the scope of the invention. Any equivalent substitutions or modifications, made by those skilled in the art based on the spirit of the disclosure, shall fall within the scope of the invention.

What is claimed is:

1. A cutting fluid, consisting of 20-25% by volume of carbon tetrachloride and 75%-80% by volume of lard, wherein the cutting fluid is prepared by mixing the lard and the carbon tetrachloride at 15-25° C. under stirring.

2. The cutting fluid of claim 1, wherein the cutting fluid consists of 25% by volume of the carbon tetrachloride and 75% by volume of the lard.

3. The cutting fluid of claim 1, wherein the cutting fluid consists of 20% by volume of the carbon tetrachloride and 80% by volume of the lard.

4. The cutting fluid of claim 1, wherein the lard has a general formula of $C_nH_{(2n+1)}COOH$, which comprises 49% by weight of oleic acid, 26% by weight of palmitic acid, 15% by weight of stearic acid, 5% by weight of linoleic acid, 1.5% by weight of palmitoleic acid, 1.5% by weight of myristic acid, and 2% by weight of moisture and impurities; and its melting point is 28-48° C.

5. An application of a cutting fluid consisting of 20%-25% by volume of carbon tetrachloride and 75%-80% by volume of lard, comprising:
    applying the cutting fluid between a product to be cut and a cutting tool by brushing or spraying.

6. The application of claim 5, wherein the cutting tool is used in mechanical lathe-turning or milling.

7. The application of claim 5, wherein the product to be cut is a niobium-tungsten alloy.

8. The application of claim 6, wherein the product to be cut is a niobium-tungsten alloy.

* * * * *